Patented May 10, 1938

2,117,226

UNITED STATES PATENT OFFICE 2,117,226

MIXING APPARATUS

Robert J. Stewart, Baltimore, Md., assignor to Crown Cork & Seal Company, Inc., Baltimore, Md., a corporation of New York Application December 6, 1935, Serial No. 53,231

40 Claims. (Cl. 259—54)

This invention is a mixing apparatus and, more particularly, an apparatus for agitating bottles filed with beverages such as soft drinks to mix the syrup and water forming the contents of the bottle.

In the operation of filling machines used in bottling beverages such as soft drinks, a predetermined amount of syrup is placed in a bottle or other container to be filled and water is then placed in the bottle to complete its filling. If the beverage is carbonated liquid, the water contains carbon dioxide gas and is flowed very quietly into the bottle in order to enable the bottle to be filled without foaming. The slow rate of flow of the water causes it to settle upon the strata of syrup in the bottom of the bottle instead of mixing with the latter, and the result is that when filled bottles leave the filling machine, after being capped, the syrup and water are not mixed but entirely separate in the bottle.

At the present time, the syrup and water in the bottle are ordinarily mixed by an attendant who removes the bottles from the filling machine and places them in bottle cases for shipment and sale. The operator usually accomplishes this manual mixing as he removes bottles from the filling machine by grasping a pair of filled bottles in each hand and quickly turning his hands several times so that the bottles will be swung or oscillated through an arc of substantially 180°.

The mixing obtained by the practice described above is hastily performed, since the operator must keep pace with the operation of the filling machine.

If the syrup and water are not completely mixed, the beverage in the upper portion of the bottle is not fully flavored, while the beverage in the lower portion will contain more than its proper proportion of the syrup. Such a condition results in complaints from consumers who, after tasting the weakly flavored upper portion of the contents of the bottle, are led to believe that the entire content of the bottle is not fully flavored.

The principal object of the present invention is to provide an apparatus which will thoroughly mix the contents of bottles and thereby insure that the beverage therein will be of a proper and uniform flavor throughout.

The apparatus of the present invention moves the bottles in a predetermined path and simultaneously tilts and uprights them, repeatedly preferably by an end over end turning movement, in a plane substantially radial with respect to that path. By this arrangement the liquid in the bottle is moved from end to end and mixed by the movement of the bottle in the radial plane and is also further agitated or mixed, during this flow, by the forward movement of the bottle along its path.

Another very important object of the invention is to provide an apparatus for mixing bottled beverages which is so constructed that it will occupy a relatively small amount of floor space.

Another important object of the invention is to provide a mixing machine which will keep pace with the production of the usual filling machine and without necessitating any varying of the linear speed of the bottles passing through the machines.

The mixing machine of the present invention is so designed that the linear speed of the bottles moving onto the rotary table thereof will not be varied to any considerable extent, thereby avoiding breakage and noise. Because of the manner in which the bottles are moved to mix their contents during their travel with the rotary table, each bottle will occupy a relatively small amount of the space about the circumference of the table. Furthermore, the movement of the respective bottles with regard to each other is so arranged that there will be no possibility of bottles of even the larger standard sizes coming into contact with each other during the operation of the machine.

A further object of the invention is to provide a mixing machine which may be readily adjusted to accommodate bottles of all standard sizes.

A still further object of the invention is to provide a mixing machine which is designed to permit it to be associated with other machines customarily used in bottling plants and more particularly to enable it to receive bottles from a filling machine in properly timed sequence.

Other objects and advantages of the invention will be apparent from the following specification and drawings wherein like numerals refer to similar parts throughout the several views:

Figure 1:
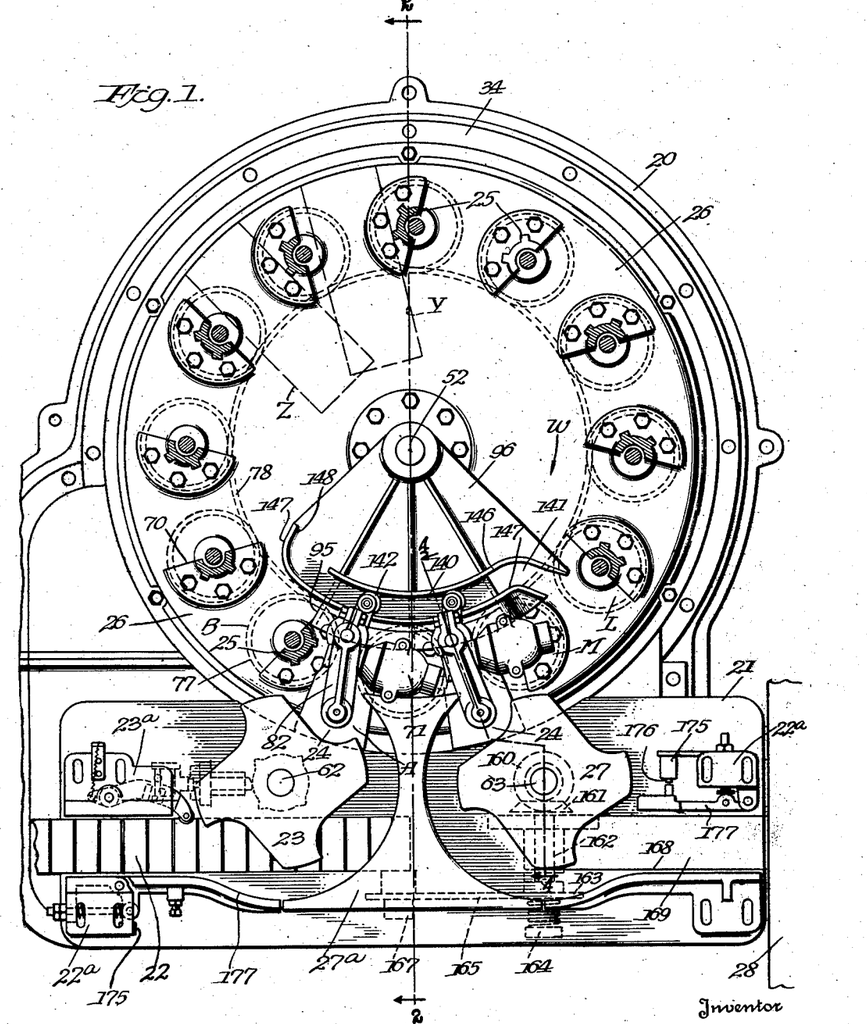
Figure 1 is a horizontal sectional view showing the casing, stationary table, and rotary table of the machine in plan.

The present apparatus comprises a casing 20 including a stationary table 21 in which an endless conveyor 22 moves, the endless conveyor delivering bottles to an infeed dial 23. The infeed dial 23 moves the bottles from the endless conveyor 22 and positions them upon bottle supporting elements or platforms 24, each mounted for turning movement in a vertical plane in one of a number of posts 25 fixed to a table 26, which is continuously rotated about a vertical axis. During the rotation of the table 26, the bottles are repeatedly tilted and uprighted, preferably by being turned end over end, as indicated by the arrows in Figure 2, to thoroughly mix their contents and they are then delivered to an outfeed dial 27 which removes the bottles from the bottle supporting platforms 24 and moves them toward an accumulating table 28. If desired the bottle may be positioned by the outfeed dial 27 upon a second endless conveyor for movement to another machine, for example, a labeling machine. The movements of the bottles with the dials 23 and 27 are aided by a guide member 27a positioned between the dials.

Mechanisms 22a may be provided adjacent the conveyor 22 and adjacent the path of movement of bottles leaving the outfeed dial 27 to stop the operation of the machine if bottles become jammed at these points. A mechanism 23a may also be provided in advance of the infeed dial 23 to insure that the bottles will be moved to this dial in properly spaced relation.

Figure 2:
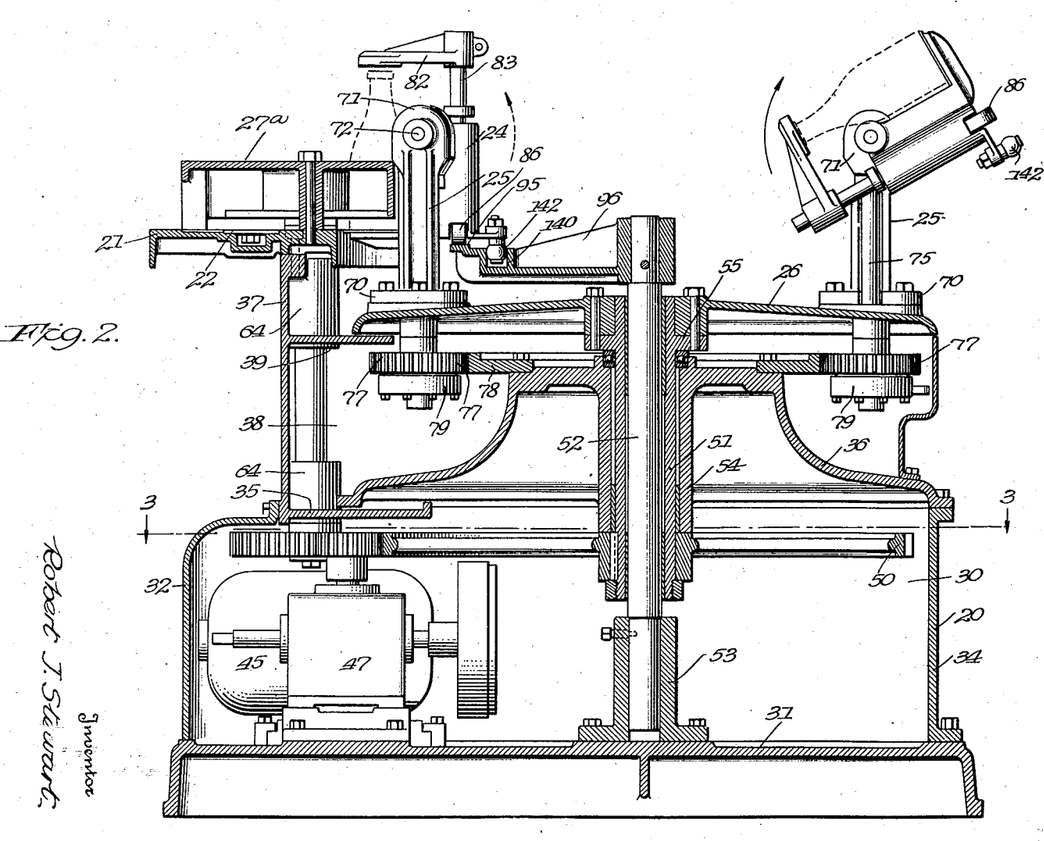
Figure 2 is a vertical sectional view taken on the line 2—2 of Figure 1, some of the bottle supporting platforms being shown broken away.
Figure 3:
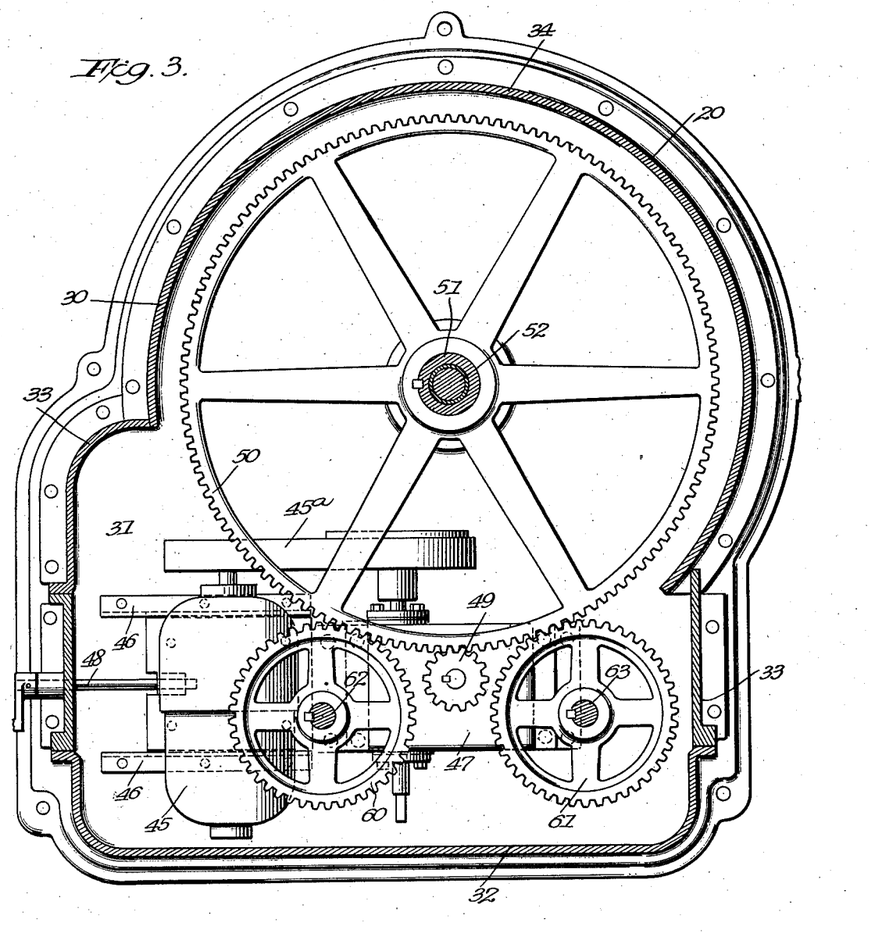
Figure 3 is a horizontal sectional view taken on the line 3—3 of Figure 2.

As is best shown in Figures 2 and 3, the casing 20 comprises a lower portion 30 including a base 31, a front wall 32 and side walls 33, the rear edges of the side walls 33 being joined by an arcuate wall 34 which encloses the rear portion of the casing. The top of the front of the lower portion 30 of the casing 20 is covered by a horizontal wall 35, the remainder of the lower portion 30 being covered by an apron-like covering 36 extending inwardly from the circular side wall 34 and to the horizontal wall 35. A front vertical wall 37 extends upwardly from the horizontal wall 35, the vertical wall 37 carrying the fixed table 21 upon its upper edge. Side walls 38 project rearwardly from the opposite edges of the front wall 37 to further assist in the support of the stationary table 21 and these walls are joined, beneath the stationary table 21, by a transversely extending shelf 39.

An electric motor 45 is preferably mounted in spaced slideways 46 secured to the base 31. A reduction gear apparatus 47 is fixed to the base 31 adjacent the motor 45 and is driven from the motor by a suitable driving belt or chain 45a. The tension exerted upon the driving belt or chain may be adjusted by means of an adjusting screw 48 extending through the side wall 33, which screw varies the position of the motor 45 in the slideways 46 and with respect to the reduction gearing 47.

The reduction gear device 47 is provided with a vertical shaft having a pinion 49 fixed to its upper end, this pinion engaging a large pinion 50 fixed to a sleeve 51 which is rotatably mounted upon a post 52 fixed against rotation in a standard 53 mounted on the base 31 of the casing 20 and substantially concentric with the arcuate wall 34 of the lower portion of the casing 20.

Both the post 52 and the sleeve 51 extend upwardly above the apron 36, the portion of the sleeve below the apron being centered in antifriction bearings provided in a depending tubular bracket 54 carried by the apron. The sleeve 51 is provided, adjacent its upper end, with a circumferential flange 55 which rests upon roller bearings supported by the apron 36. The rotary table 26 of the machine is bolted to the flange 55.

Figures 4, 7:
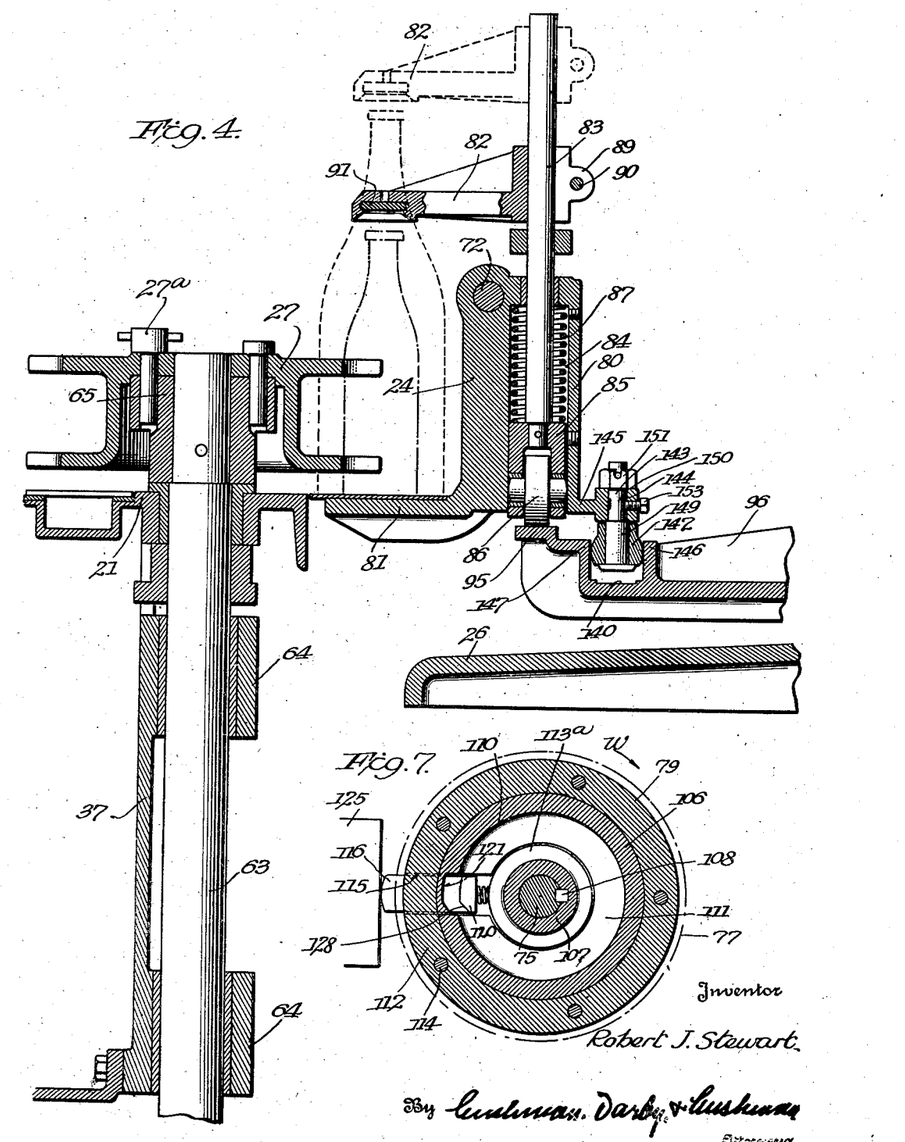
Figure 4 is a detailed vertical sectional view on the line 4—4 of Figure 1 and showing a bottle
Figure 7 is a detailed horizontal sectional view taken on the line 7—7 of Figure 6.

As is illustrated in Figures 2 and 3, the large gear 50 meshes with gears 60 and 61 fixed to vertical shafts 62 and 63, respectively, which shafts are journaled in bearings 64 fixed to the front wall 37 of the casing. As shown in Figure 1, the shaft 62 carries the infeed dial 23 at its upper end and above the surface of the table 21. The shaft 63 carries the outfeed dial 27. Figure 4 illustrates how the dials are removably and adjustably held by removable pins 27a upon collars 65 fixed to the vertical shafts.

The means for driving conveyor 22 will be hereinafter described in connection with the modified form of drive shown in Figures 12 and 13.

The posts 25 (Figures 1 and 2) are secured to the rotary table 26 adjacent the periphery thereof, equidistantly circumferentially spaced, and, in the present embodiment of the invention, twelve such posts are provided. Each post 25 (Figure 8) has a base 70 at its lower end which is bolted to the table 26 and, at its upper end, includes a head 71 in which is journaled a horizontal stub shaft 72, one end of the stub shaft projecting from the head and having a bottle supporting element or platform 24, fixed thereto. The stub shaft 72 has a bevel gear 73 keyed upon it, which gear meshes with a bevel gear 74 fixed to the upper end of a vertical shaft 75 journaled in the lower wall of the head 71 and, adjacent its lower end, journaled in a flanged aperture 76 in the table 26. Each shaft 75 is provided at its lower end and beneath the table 26 with a pinion 77 which meshes with a large stationary gear 78 fixed upon the apron 26 of the casing 20 (see Figure 2).

It will be noted that the above mounting of each horizontal stub shaft 72 positions the axis of each such shaft in a plane substantially transverse to a line extending radially of the rotary table 26.

By the form of bottle supporting element movement controlling means shown in Figures 5 to 9, the pinions 77 are operably connected to the vertical shafts 75 by means of a clutch structure 79 positioned upon each shaft 75 and which will be hereinafter described in detail. When the clutch 79 upon a given vertical shaft 75 is in engaged position, the movement of the pinion 77 thereon with the rotary table 26 and about the fixed gear 78 will result in rotation of that shaft 75 and the bottle supporting platform 24 with which it is connected. With the table 26 turning in a clockwise direction, Figure 1, each bottle supporting platform will rotate as indicated in Figure 2, turning the bottle carried thereby end for end and thus the bottle is repeatedly tilted and uprighted. During the movement of a bottle supporting platform adjacent the fixed table 21, the clutch 29 of such platform will be disengaged and the platform will remain upright and stationary with respect to the table 26, as shown in Figure 4 and at the left of Figure 2, so that bottles may be moved on or off the same.

Figure 8:
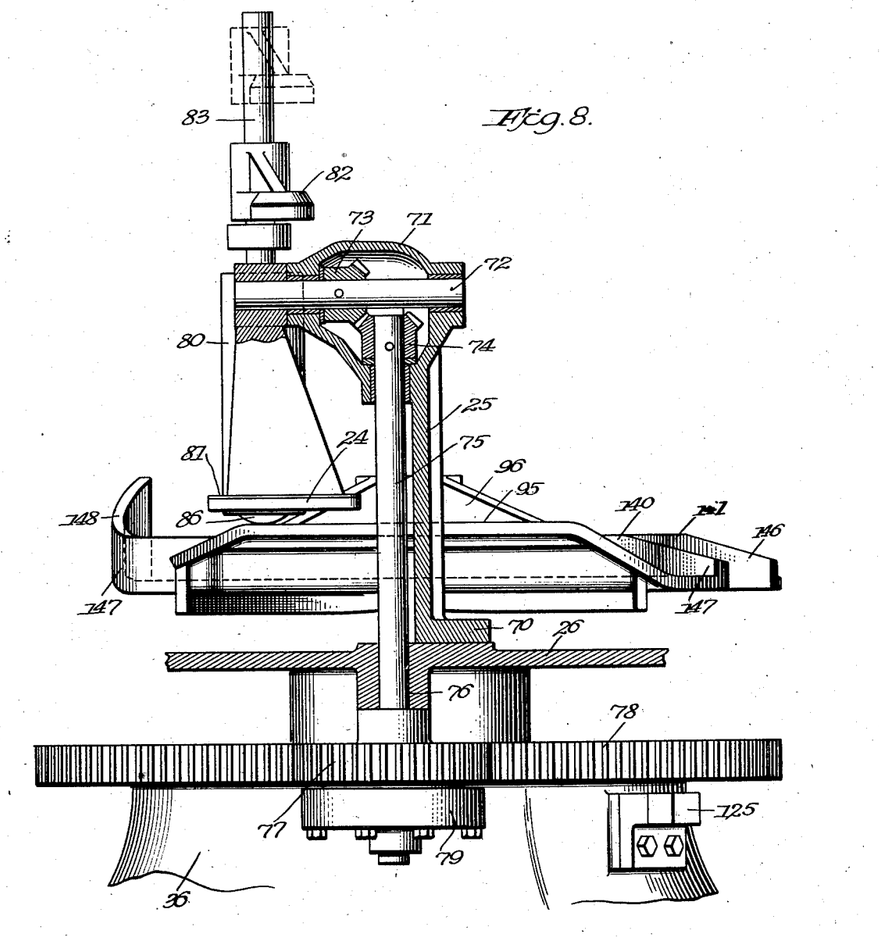
Figure 8 is a detailed view, partly in front elevation and partly in vertical section, showing a bottle supporting element and the cam mechanism for controlling the same during its movement adjacent the stationary table of the machine.

As shown in Figures 4 and 8, each bottle supporting platform 24 comprises a body portion 80 and an integral shelf or platform 81, the platform 81 being adapted to support a bottle. In order to clamp a bottle upon the platform 81 of each bottle supporting platform, a clamping head 82 is provided upon a vertical plunger or stem 83 slidably mounted in a bore 84 (Figure 4) in the body portion of the platform. The plunger 83 has a collar 85 fixed to its lower or outer end, which collar is bifurcated at its lower portion and there carries a roller 86. A coil spring 86 is positioned in the bore 84 of the body portion, one end of the spring bearing against the upper or inner end of the bore and the other end bearing upon the collar 85, tending to force the plunger 83 and clamping head 82 downwardly with respect to the base portion 81 of the bottle supporting platform.

The clamping head 82 is in the form of an arm provided at its inner end with a split collar 89, the split collar permitting the head to be vertically adjusted upon the plunger 83 and clamped in position by means of a transverse bolt 90. Various adjusted positions of the head, corresponding to various sizes of bottles, are indicated in Figures 4 and 8. The clamping head 82 carries a resilient disc 91 in its outer end, which disc is intended to contact with the cap upon the bottle to clamp the latter upon the platform 24. The wall of the head about the disc 91 is tapered as shown in Figure 4 to guide the bottle into proper alignment with the disc.

Throughout the portion of the movement of the rotary table 26 during which the bottle supporting platforms are turned, the clamping head 82 will bear upon the head of the bottle due to the action of the coil spring 87. During the interval when a bottle supporting platform 24 is adjacent the stationary table 21, the roller 86 of the platform will bear upon an arcuate cam 95 of the platform will bear upon an arcuate cam 95 provided on the outer edge of a sector 96, which sector is fixed to the upper end of the post 52.

The movement of the rollers 86 across the cam 95 will hold them upwardly as shown in Figure 4, maintaining the clamping heads 82 in upward position so that a bottle may be removed from the platform by the outfeed dial 27 and another bottle positioned thereupon by the infeed dial 23.

As has been stated above, in order to cause the bottle supporting platforms to remain horizontal and with respect to their posts 25 during the interval when they are adjacent the fixed table 21 and to cause them to turn while away from the fixed table, a clutch mechanism 79 is provided on each vertical shaft 75. Broadly speaking, this clutch comprises elements fixed to each pinion 77 and elements fixed to each vertical shaft 75. When these elements are locked together by a clutch bolt 116, the rotation of the pinion 77 will rotate the shaft 75 to revolve the bottle supporting platform driven by the latter. When a clutch is disengaged, its pinion 77 will continue to rotate, but the corresponding shaft 75 and bottle supporting platform will remain stationary.

Figure 6:
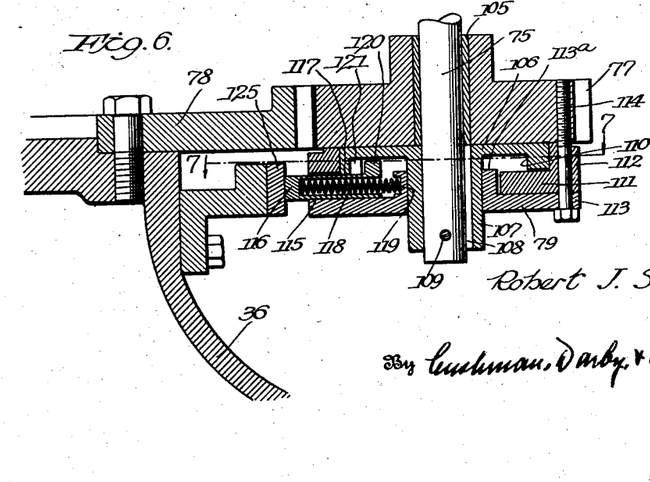
Figure 6 is a detailed vertical sectional view taken on the line 6—6 of Figure 5.
Figures 9, 10:
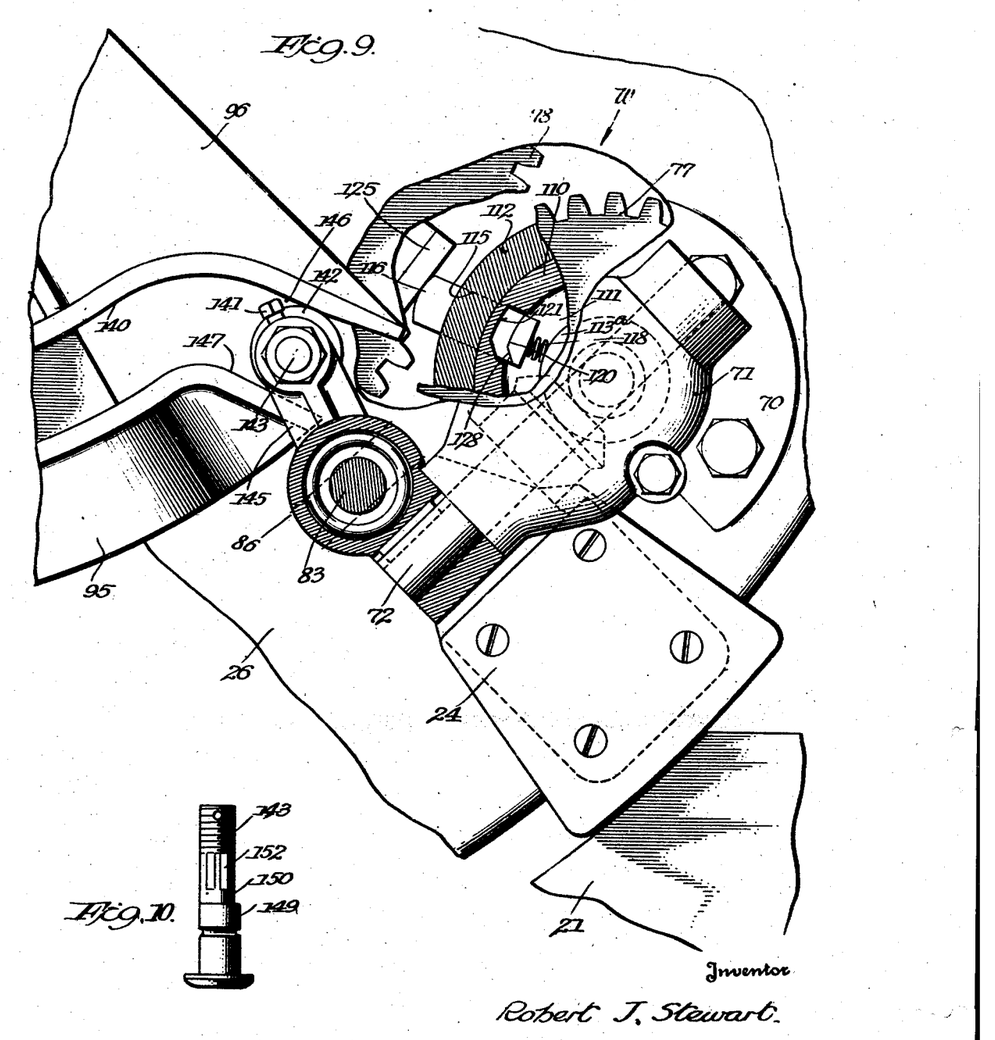
Figure 9 is a detailed view, partly in plan and partly in horizontal section, showing a bottle supporting element and a portion of the mechanism for controlling the position of the same during its movement adjacent the stationary table of the machine.
Figure 10 is a detailed view showing an eccentric bolt used for adjusting the position of a bottle supporting element.

The clutch mechanism is best shown in Figures 6, 7 and 9 and, as is illustrated in these figures, the pinion 77 is mounted about a bushing 105 on the shaft 75 and rests upon a disc 106 including a downwardly extending hub 107, which hub is keyed to the shaft 75 at 108 and held in proper position therein by a pin 109.

The disc 106 is provided with a depending flange 110 about its periphery and the upper surface of a flat guide ring 111 bears against this flange, the guide ring 111 being provided with an upwardly projecting flange 112 about its outer edge. A base plate 113 of disc form and including an upwardly projecting hub 113a is positioned about the hub 107 and against the lower surface of the guide ring 111, the hub 113a of the base plate projecting upwardly within the inner edge of the guide ring 111. The base plate 113 and guide ring 111 are secured to the under-surface of the pinion 77 by means of circumferentially spaced bolts 114.

A radially extending cut-out or slideway 115 is provided in each guide ring 111, the lower side of this slideway being closed by the base plate 113 and its upper side being bridged by the flange 112 of guide ring 111. A clutch bolt 116 is positioned in the slideway 115, the bolt 116 having a longitudinal bore 117 therein opening from its inner end and in which a coil spring 118 is positioned. The inner end of the coil spring is seated in a socket 119 in the hub 113a of the base plate 113. The clutch bolt is also provided with an upwardly extending shoulder 120, which shoulder is seated in a notch 121 on the inner surface of the flange 110 of the disc 106 when a bottle supporting platform 24 is moving with the rotary table 26 out of proximity to the fixed table 21.

As best shown in Figures 7 and 9, one side wall 128 of each clutch bolt 116 is inclined and the notch 121 is similarly formed, this inclination permitting the bolt to readily slide into the notch.

A trip block 125 (Figures 5 and 9) is fixed to the apron 36 of the machine and, as is hereinafter described, the contact of the outer end of a clutch bolt 116 with this block will move the clutch bolt inwardly so that is shoulder 120 will be moved out of the notch 121. The continuing turning movement of the pinion 77 will cause shoulder 120 to merely slide about upon the flange 110 of the disc 106 until the shoulder again comes into alignment with the notch.

The operation of the clutches 79 will be set forth in connection with the operation of the entire machine, but it will be obvious from the above that when the shoulder 120 of a clutch bolt 116 is seated in the notch 121 of a disc 106 fixed to a shaft 75, the pinion 77 and shaft 75 and the bottle supporting platform rotated by the latter will turn together, while when a clutch bolt shoulder 120 is merely sliding about upon the inner wall of a disc 106, the shaft 75 and the bottle supporting platform controlled thereby will remain stationary.

The trip block 125 is so positioned (Figure 5) that a clutch bolt 116 will make contact therewith to release the corresponding clutch 79 just prior to the movement of a bottle supporting platform adjacent to the fixed table 21. Since a bottle supporting platform will be free from its pinion 77 after the release of the clutch bolt, the platform would ordinarily be free to swing and seek its center of gravity after the release of the clutch bolt. In order to insure that the platforms will be in horizontal position and maintain the bottles upright when moving past the fixed table 21, a substantially arcuate cam track 140 is provided on the fixed sector 96, this cam track being shown in Figures 1, 2, 4, 8 and 9, the latter figure showing the entrance end 141 of the cam track and a bottle supporting platform in the position which it will occupy at the moment that its clutch bolt 116 is released.

The cam track 140 will be engaged by a guide roller 142 rotatable upon a stud 143 fixed in an aperture 144 of an arm 145 extending rearwardly from the lower inner end of the body portion 80 of each bottle supporting platform. As best shown in Figure 4, the peripheral surfaces of the guide rollers 142 are arcuate in cross section and are thus substantially ball-shaped.

The cam track 140 includes inner and outer walls 146 and 147, respectively, and, as best shown in Figures 1 and 8, the cam track is curved outwardly at its entrance end 141 and the upper surfaces of the walls 146 and 147 are downwardly and outwardly inclined at the entrance end. The exit end 148 of the cam track is curved inwardly and the upper surface of the outer wall 147 is upwardly inclined, the inner wall 146 terminating short of the outer wall.

As shown in Figure 9, at the instant that the trip block 125 releases the clutch bolt 116 of a bottle supporting platform 24, the guide roller 142 of that platform will be moving inwardly into the entrance end 141 of the cam track 140, because the lower end of the bottle supporting platform will be swinging inwardly toward the axis of the rotary table 26. The guide roller 142 being in guided engagement with the cam track 140 will prevent the bottle supporting platform from swinging except as controlled by the cam track. The ball shape of the guide roller will permit it to enter and properly engage the cam track although its axis of rotation is not vertical at the moment it enters the entrance end.

The cam track 140 is so designed that the engagement of the guided roller 142 therewith will hold the bottle supporting platforms horizontal and flush with respect to the fixed table 21 during the movement of the platforms past the table and a bottle may be removed from a platform and a new one positioned on the platform by the dials. The exit end 148 of the cam track will cause the lower ends of the bottle supporting platforms to be swung inwardly and upwardly by the engagement of their guiding rollers 142 with the inwardly curved and upwardly extending outer wall 147 of the cam track at this point. Before a guide roller 142 has entirely moved out of the exit end of the cam track, the corresponding clutch bolt 116 will again be in engaged position so that the subsequent turning movements of the bottle supporting platform will be controlled by its pinion 77.

In order to permit the base 83 of each bottle supporting platform to be so adjusted that it will be exactly flush with the stationary table 21 when moving past the latter, the lower portion 149 of each stud 143 is eccentric with respect to the portion 150 of the stud which is positioned in the aperture 144 of the arm 145. By this arrangement, with a bottle supporting platform positioned to have its guide roller in the cam track 140, its roller carrying stud 143 may be loosened by unthreading movement of the nut 151 provided at its upper end, and the stud may then be turned to vary the radial position of the eccentric portion 149 with respect to the aperture in the arm 145. The guide roller 142 being positioned in the cam track, the bottle supporting platform will be swung upon its post 25 to raise or lower the outer edge of the base 81 with respect to the stationary table 21. The portion 150 of the stud 143 may have circumferentially spaced flattened portions 152 provided thereon against which the inner end of a set screw 153 threaded in the arm 145 is adapted to bear to hold the stud in properly adjusted position.

Because of the close spacing of the posts 25 with respect to each other, the bottle supporting platforms 24 journalled therein would strike against each other if each platform were in the same position in its respective path of turning movement at the same instant. In order to prevent the platforms from striking, they are so arranged that during the rotation of the platform, any given platform will be in a position in its path of rotation upon its post 25, 120° ahead of the next succeeding platform. The necessity for this arrangement will be obvious from the showing of Figure 1 wherein the angled dotted line Y indicates the space through which one bottle supporting platform will pass and the angled dotted line Z indicates the path through which the next succeeding bottle platform will pass. As is obvious from this showing, the two paths of movement overlap when the bottle supporting platforms are at their inner horizontal position.

The above arrangement of having adjacent bottle platforms spaced apart at different angular phases in their paths of rotary movements with respect to their posts 25 permits the rotary table 26 to be of minimum diameter, thereby insuring that the machine will occupy a minimum amount of floor space and that the linear speed of the bottles will not be unduly increased during their movement upon the rotary table.

Figure 12:
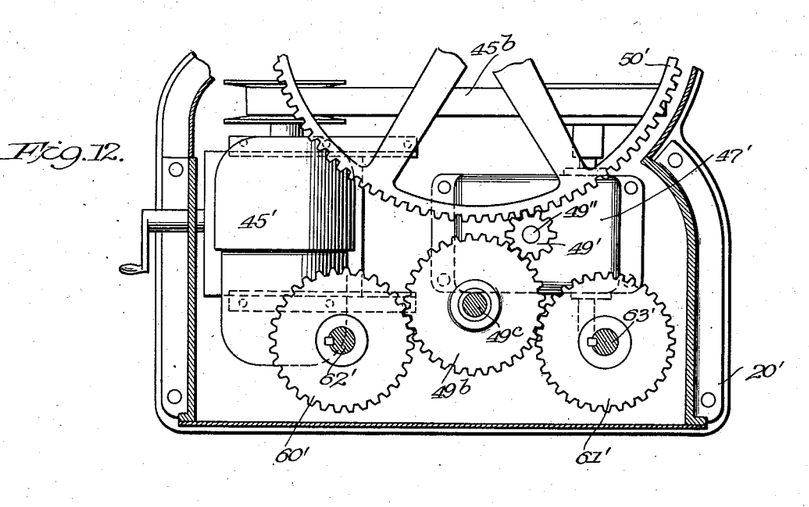
Figure 12 is a horizontal sectional view through the casing of the machine showing a modified arrangement of driving gearing which may be used.

Figure 12 shows a modified form of drive mechanism for the machine including a motor 45' which drives a gear reducing unit 47' by means of a belt 45b. The gear reducing unit includes a vertical shaft 49" carrying a pinion 49' which meshes with a pinion 49b upon a vertical shaft 49c journaled in the horizontal wall 35 of the casing. Pinion 49b also meshes with a large gear 50' fixed to the sleeve carrying the rotary table of the machine. The shaft 49c is so positioned that its pinion 49b meshes with a pinion 60' fixed to the shaft 62' carrying the infeed dial of the machine and with a pinion 61' fixed to the shaft 63' carrying the outfeed dial. By the above arrangement, the large gear 50' which rotates the rotary table may be of smaller size than the gear 50 disclosed in Figure 3 and the drive of the machine is somewhat more centralized, permitting the casing of the machine to be correspondingly reduced in size. The operation of the machine will be the same regardless of whether the driving mechanism disclosed in Figure 3 or that shown in Figures 12 and 13 is used.

Figure 13:
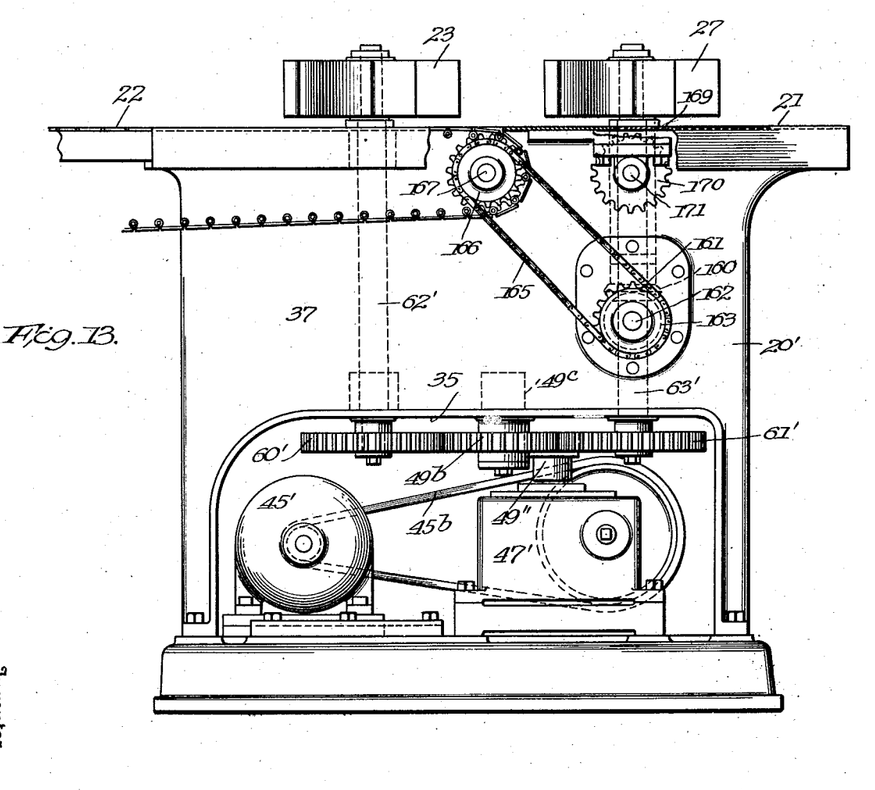
Figure 13 is a front view of the stationary table of a machine provided with the drive mechanism of Figure 12, with portions of the front wall removed to show the drive mechanism.

Figure 13 shows the manner of driving the infeed conveyor 22 from the vertical outfeed dial shaft 63' of Figure 12. Since the drive of Figures 1 to 3 includes an outfeed dial shaft 63 exactly corresponding to shaft 63' of Figures 12 and 13, the infeed conveyor used in Figures 1 to 3 may be driven in the same manner as that described below and the conveyor driving mechanism is shown in plan, in dotted lines, in Figure 1.

Shaft 63' has a mitre gear 160 fixed thereto, which gear meshes with a mitre gear 161 fixed to a horizontal stub shaft 162. Shaft 162 carries a sprocket 163, an overload release clutch 164 (Figure 1) being provided between the sprocket and its shaft. A drive chain 165 engaging the sprocket 163 rotates a sprocket 166 fixed to a conveyor drive shaft 167 about which the conveyor 22 moves.

If the bottles passing through the outfeed dial 27 are to be delivered to an accumulating table 28 as shown in Figure 1, a plate 169 will be fitted in a space or cut-out 168 in the stationary table 21 to provide a smooth, flush surface over which the bottles may move. If the bottles are to be moved to a labeling or other machine, the plate 169 may be removed and an outfeed conveyor driven by the labeling or other machine will move in the space 168, this conveyor passing about an idler sprocket 170 (Figure 13) carried on a horizontal stub shaft 171 which may be suitably journaled at the inner end of the space 168. The bottles moving from the outfeed dial 27 will then be positioned upon the outfeed conveyor and conducted from the machine by the latter.

In bottling plants, it is usual to so arrange the infeed conveyor of a machine that it will be driven by that machine. As shown in Figures 1 and 13, the infeed conveyor 22 merely delivers bottles to the infeed dial 23 and the movement of this conveyor will be accurately timed with respect to the movement of the infeed dial and the operation of the machine.

By having any outfeed conveyor used with the present machine arranged to be driven from the machine to which it conducts the bottles, the necessity of an extended outfeed conveyor driving mechanism is eliminated in the present machine and the drive of the conveyor to the next machine will be timed with the latter machine. It is highly desirable that whatever conveyor is used to conduct bottles from the present machine to another machine should be timed with the latter machine rather than with the present machine.

Obviously, the provision of a space for a conveyor from the present machine to a machine receiving bottles therefrom, permits any well known type of conveyor to be readily connected to the present machine for outfeed purposes.

The present conveyor arrangement is also more practical than any construction wherein a single conveyor is used to move bottles into the machine and to also move them from it to another machine, because when a single conveyor driven by the mixing machine is used to perform the operation of delivering bottles to an adjacent machine, such a conveyor will be timed for infeed to the mixing machine, but not to the adjacent machine and the efficiency of the latter machine will be affected.

The operation of a machine of my invention including the bottle supporting element movement controlling means disclosed in detail in Figures 5 to 9 is as follows:

Any one of the bottle supporting platforms 24 will rotate to turn or revolve the bottle thereon end over end in a plane substantially radial with respect to rotary table 26, during three-fourths of the path of movement of the bottle supporting platform with the rotary table. In other words, during the major portion of the movement of bottles with the rotary table 26, the bottles will be repeatedly tilted and uprighted, preferably by being turned end over end, and on axes substantially transverse to planes radial with respect to the table 26, the bottles thus moving in planes substantially radial with respect to the rotary table. During the remaining one quarter of the movement of a bottle platform, that is, during the portion of its movement when it is adjacent the stationary table 21, the bottle supporting platform will be horizontal to receive and discharge bottles in upright position, and the bottle carrying shelf 81 will be flush with the surface of the stationary table 21. This operation is attained by reason of the fact that the pinion 77 at the lower end of the vertical shaft 75 of each bottle supporting platform is so geared with respect to the large stationary gear 78 that each shaft 75 and the bottle supporting platform operated thereby will make four complete revolutions while moving entirely about the large stationary gear 75. During three of these revolutions, the clutch 79 of a bottle supporting platform will be engaged so that rotation of its pinion 77 will be transmitted directly to the shaft 75 to rotate that bottle supporting platform. At the moment when the three revolutions of the pinion 77 have been completed and the bottle carried by the bottle supporting platform has thus been revolved or turned end over end three times, the outer end of the clutch bolt 116 of the clutch 79 beneath the pinion 77 of that bottle supporting platform will wipe against the trip block 125 fixed to the apron 36 of the casing of the machine as best shown in Figures 7 and 9. The clutch bolt 116 will make a wiping contact with the block 125 by reason of the fact that the pinion 77 and clutch mechanism 79 are, at this moment, rotating together in a clockwise direction and bodily moving in a direction of the arrows W of Figures 1, 5, 7 and 9.

Figure 5:
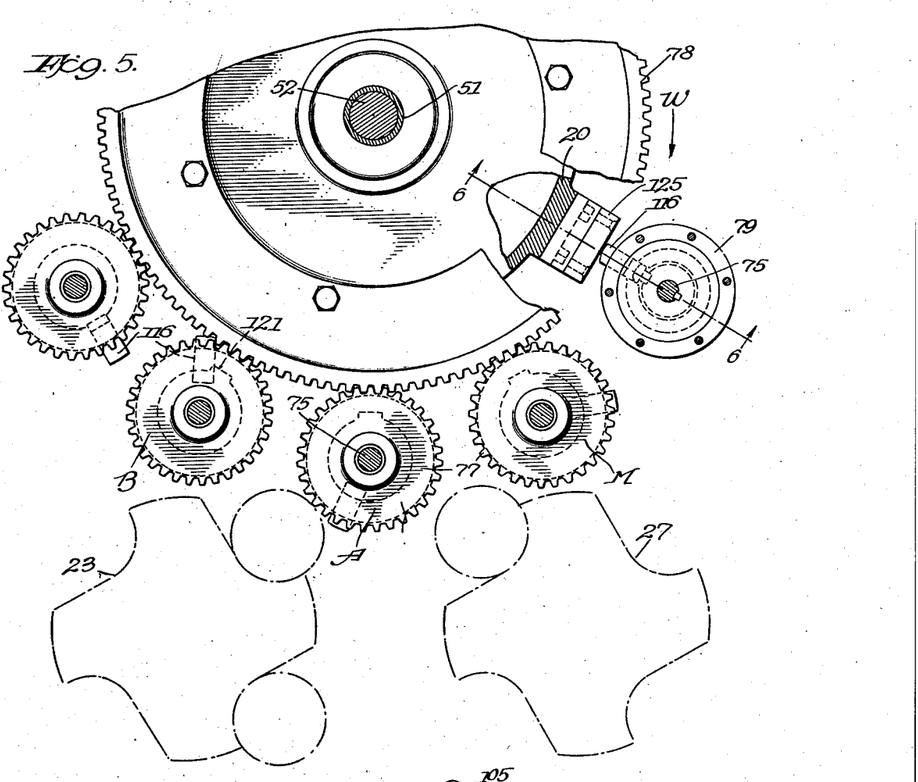
Figure 5 is a detailed horizontal sectional view showing the gearing for turning the bottle supporting elements of the machine.

The block 125 will press the clutch bolt 116 inwardly in the slideway 115, as shown in Figure 9 and in position L in Figure 5, against the action of the spring 118, and will hold the bolt 116 in the inward position illustrated in Figure 9 for a very short interval of time, during which interval the pinion 77 to which the guide ring 111 and base plate 113 are fixed will continue to rotate because of the intermeshing of the pinion 77 with the fixed gear 78. Since the ring 111 and base plate 113 are fixed to the pinion 77 and because these two elements guide and carry the clutch bolt, the rotation of the pinion 77 will cause the shoulder 120 on bolt 116 to move out of radial alignment with the notch 121 in the now stationary disc 106. Therefore, when the outer end of the clutch bolt 116 moves clear of the trip block 125, the spring 118 can only force the shoulder 120 of the clutch bolt against the inner surface of the flange 110 on the disc 106. The shaft 75 and its bottle platform 24, being disconnected from the pinion 77, will cease to rotate while the pinion 77 and plates 111 and 113 will continue to rotate, moving the clutch bolt 116 about with the clutch bolt shoulder 120 sliding on the inner surface of the flange 110 as indicated at positions M, A and B of Figure 5. As will be noted from this latter figure, the pinion 77 will make one complete revolution free of driving connection with the disc 106 and the vertical shaft 75 to which the latter is fixed, the rotation continuing until the shoulder 120 on the clutch bolt again comes into alignment with the notch 121 in the disc 106. At position B in Figure 5, the clutch bolt 116 is almost in position to move outwardly and into the notch 121.

Before the clutch bolt 116 of a platform 24 has been moved inwardly by the trip block 125, the guide roller 142 of that platform will be in the cam track 140, as shown in Figure 9, so that the platform will be held in upright position while moving past the stationary table 21. Also, the clamping head 82 of the bottle supporting platform will be raised as shown in Figure 4 by reason of the engagement of the roller 86 with the cam 95, permitting the bottle which has been moved upon the platform 24 to be removed by the outfeed dial 27 and a new bottle positioned thereon by the infeed dial 23. While the platform is still in upright and clutch disengaged position, the roller 86 will move off the cam 95 and the clamping head 82 will move downwardly to clamping position upon the newly inserted bottle.

It will be noted that the cam 95 is raised above the cam track 140 so that the rollers 86 will not project downwardly sufficiently far to strike the cam track 140.

The alignment of the clutch bolt 116 of a bottle supporting platform with the cooperating notch 121 will occur while the guide roller 142 of a bottle supporting platform is still in engagement with the exit end 168 of the cam track 140 and, by this arrangement, there will be no interval during which the bottle supporting platform is free to swing without its movement being controlled by either the cam track 140 or the pinion 77. When a clutch bolt comes into alignment with the notch 121, the spring 118 will force the clutch bolt 116 outwardly into the notch and the pinion 77 will immediately be locked to the shaft 75 to rotate that bottle supporting platform.

Figure 11:
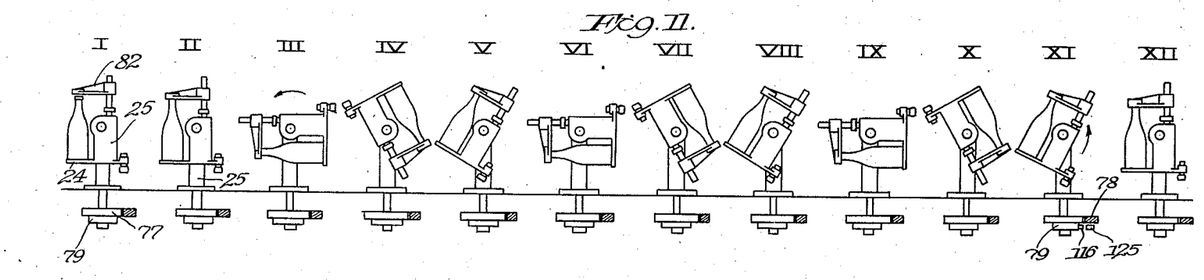
Figure 11 is a diagrammatic view showing the turning movements of the bottle supporting elements while moving with the rotary table.

Figure 11 diagrammatically illustrates the relative positions of the bottle supporting platforms during their movement with the table, each view being taken looking in a direction clockwise of Figure 1 and at a tangent to the rotary table 26. At the position indicated by the numeral I a bottle platform is shown in the position it occupies with respect to its post 25 while at the position A in Figures 1 and 5 when the bottle is being positioned upon the platform and while its clamping head 82 is raised. The platform shown in position II in Figure 11 substantially corresponds to the platform indicated at B in Figures 1 and 5 and is still in upright position but its clamping head 82 has been lowered upon the bottle. In positions III to X of Figure 11, the respective platforms are shown in various positions which they will occupy relative to their respective posts 25, at a given moment, it being noted that each platform is 120°, in its turning movement on its post 25, in advance of the next succeeding platform.

The platform illustrated at position XI in Figure 11 is swinging downwardly to upright position and the clutch bolt 116 of its clutch 79 is about to move into wiping contact with the trip 125 beneath the stationary gear 78. The bottle supporting platform shown at position XII is in upright position, its clutch being disengaged. The bottle platform shown in position XII in Figure 11 substantially corresponds to the platform at position M in Figures 1 and 5.

It will be noted that while the bottles are being repeatedly tilted and uprighted by being turned end over end as shown in Figure 11, they are also moving with the rotating table. That is, the bottles are simultaneously moved in two directions, (1) radially of the table and (2) with the table, thereby causing their contents to be thoroughly mixed. The mixing of the bottle contents is further due to the fact that while the bottles are being carried by the rotary table or member 26 from the infeed dial 23 to the outfeed dial 27, their contents are constantly agitated, since the bottles have imparted thereto a movement which is continuous in the sense that during substantially no portion of the time that the bottles are on the table are their contents in a state of rest. In other words, the bottle contents are constantly agitated from a time shortly after the bottles are received by the table until they come adjacent the outfeed dial 27, and thus throughout the greater portion of the table movement, the bottle contents are constantly and uninterruptedly agitated.

Figure 14:
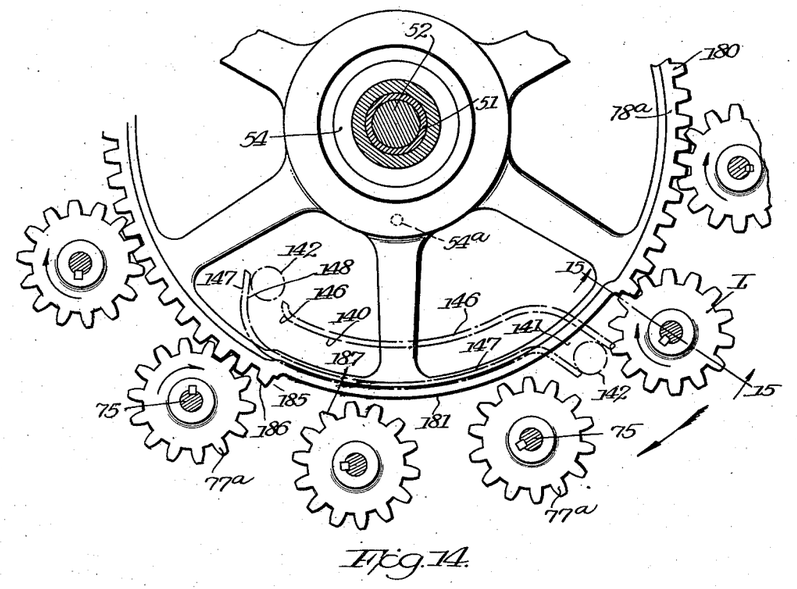
Figure 14 is a horizontal sectional view showing a modified form of gearing for turning the bottle supporting elements of the machine.
Figure 15:
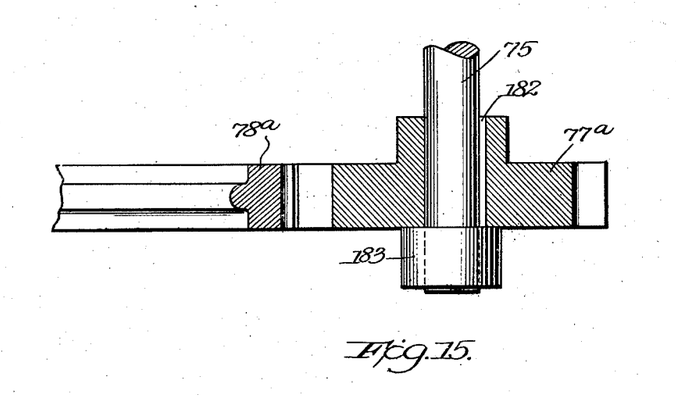
Figure 15 is a vertical sectional view taken on the line 15—15 of Figure 14.

Figures 14 and 15 show a modified arrangement for controlling the movement of the bottle supporting elements. The construction illustrated in these two figures comprises a fixed circular rack or gear element 78a supported upon the fixed tubular bracket 54 and held fixed to bracket 54 by pins or bolts or other securing means as indicated at 54a. The fixed gear or rack 78a is provided with a toothed or driving portion 180 extending about the major portion of its periphery and a non-toothed or non-driving portion 181 extending about the remaining portion of its periphery, which latter is the portion adjacent the stationary table 21 of the machine.

The shaft 75 of each bottle supporting element is provided with a pinion 77a keyed to the shaft by a key 182, the pinion being supported upon the shaft by a collar 183 suitably fixed to the shaft, the clutch structure 79 being eliminated in the construction shown in Figures 14 and 15.

By the arrangement disclosed in Figures 14 and 15, as each pinion 77a is moved about the toothed or driving portion 180 of fixed gear 78a, the pinion 77a will be rotated, causing its bottle supporting element to be turned in the manner described in connection with Figures 1 to 11. When a pinion 77a reaches the position indicated at L in Figure 14, its teeth will move out of engagement with the teeth of the fixed gear 78a and its shaft 75 will thereupon cease to rotate. At the same moment, the corresponding guide roller 142 will move into the entrance end 141 of the cam track 140, holding the bottle supporting element stationary and flush with the surface of the stationary table of the machine. After a bottle has been removed from the bottle supporting element 24 and another bottle placed upon that element, the continued movement of the bottle supporting element and the pinion 77a operatively connected thereto with the table 26 will bring the pinion 77a in engagement with the leading end 185 of the toothed portion 180 of gear 78a so that the bottle supporting element will again be turned by positive driving action as its guide roller 142 leaves the exit end 148 of the cam track 140. In order to facilitate reengagement of the teeth of the pinions 77a with the teeth of the gear 78a, the rear corner of the first tooth 186 at the entrance end 185 is slightly sheared as indicated in Figure 14. Also, the tooth 187 of each pinion 77a which will always be in position to engage behind tooth 186 is slightly cut-away so that it will readily pass the sheared tooth 186 and into engagement with the toothed portion 180.

The modification disclosed in Figures 14 and 15 provides a positive drive for the bottle supporting elements which will cause these elements to be operated in a manner identical with that described in connection with Figures 1 to 11 and without the use of a clutch structure 79.

The mechanism 23a provided in advance of the infeed dial 23 to insure that bottles will be fed thereto in properly spaced relation, is identical with that disclosed in the Patent No. 2,013,-144, September 3, 1935, of Wiltie I. Gladfelter, Bottle capping machines.

The mechanisms 22a for stopping the operation of the machine in the event that bottles become jammed in advance of the infeed dial 23 or at the outfeed dial 27 are also identical with the corresponding structures disclosed in the above mentioned Gladfelter application, except that the present devices include an electric switch 175 including an operating plunger 176, this operating plunger being adapted to be moved inwardly to open an electric switch and the circuit to the motor of the machine, upon inward movement of the levers 177 on their respective pivots when bottles become jammed opposite either lever. The operation of the present devices is therefore identical with that of the devices disclosed in the Gladfelter patent except that they control electric circuits instead of fluid pressure lines as is the case in the Gladfelter patent. The use of electric switches at these devices as in the present structure permits the entire machine to be operated and controlled by electric means and eliminates the necessity of supplying compressed air or other compressed fluid to the machine. This application is a continuation-in-part of an earlier filed application Serial No. 714,727, filed March 8, 1934.

It will be understood that the invention is not limited to the details of construction shown in the drawings and that the example of the use of the machine which has been given does not include all of the uses of which it is capable, and that the phraseology employed in the specification is for the purpose of description and not of limitation.

I claim:—

1. An apparatus for mixing the contents of a container comprising a support, a member movable on said support in a fixed path, means upon said member to support a container and journaled for repeated end over end movement in a plane transverse to the path of movement of said member, and means to move said member and said container supporting means.

2. An apparatus for mixing the contents of a container comprising a rotary member, means to support a container upon said rotary member and means to rotate said supporting means and container end over end in a plane substantially radial with respect to said rotary member.

3. An apparatus for mixing the contents of a container comprising means to support a container and move the same in an orbital path, and means to rotate said supporting means and container end over end in a plane substantially radial with respect to said orbital path.

4. An apparatus for mixing the contents of a container comprising a rotary member, a container supporting element, means on said member to support said element for rotary movement in a plane substantially radial with respect to said rotary member, means to move said element end over end in said plane during a portion of its movement with said rotary member, and means to hold said element stationary upon said rotary member during the remaining portion of the movement of the latter.

5. An apparatus for mixing the contents of a container comprising a rotary member, a container supporting element, means on said member to support said element for movement in a plane substantially radial with respect to said rotary member, means to move said element in said plane throughout the greater portion of its movement with said rotary member so as to continuously agitate the contents of a container carried by said container supporting element, and means to hold said element stationary upon said rotary member during a minor portion of the movement of the latter.

6. An apparatus for mixing the contents of a container comprising a rotary member, a container supporting element, means on said member to support said element for movement in a plane substantially radial with respect to said member, means to move said element in said plane throughout the greater portion of its movement with said rotary member so as to continuously agitate the contents of a container carried by said container supporting element, means to hold said element stationary upon said rotary member during a minor portion of the movement of the latter, and means to deliver and remove containers from said element during the last-mentioned portion of the movement of said rotary member.

7. An apparatus for mixing the contents of a container comprising a rotary member, a container supporting element journaled on said member for end over end rotation in a plane substantially radial with respect to said member, means to move said element in said plane, and means to render said last-named means ineffective at a predetermined point in the travel of said member.

8. An apparatus for mixing the contents of a container comprising a support, a gear fixed to said support, a rotary member journaled upon said support, a container supporting element carried by said member and journaled for movement in a plane substantially radial with respect to said member, gear means engaging said fixed gear to rotate said element, said gear means including a clutch element to cause said supporting element to be disengaged from driving relation with said stationary gear during a portion of the path of movement of said rotary member, and means to operate said clutch element.

9. An apparatus for mixing the contents of a container comprising a support, a rotary member journaled on said support, a container supporting element journaled on said member for movement in a plane substantially radial with respect to said member, a gear member fixed to said support, a second gear meshing with said gear member, means to operatively connect said second gear to said supporting element during a portion of the movement of said rotary member, and means to disconnect said second gear from operation of said element during another portion of the movement of said rotary member.

10. An apparatus for mixing the contents of a container comprising a support, a rotary member journaled on said support, a container supporting element journaled on said member for movement in a plane substantially radial with respect to said member, a gear member fixed to said support, a shaft journaled in said rotary member and operatively connected to said supporting element, a second gear mounted on said shaft, means to operatively connect said second gear to said shaft during a portion of the movement of said rotary member, and means to disconnect said gear from operation of said shaft during another portion of the movement of said rotary member.

11. An apparatus for mixing the contents of a container comprising a rotary member, a plurality of container supporting elements journaled in circumferential series on said member for end over end rotation in planes radial with respect to said member, adjacent elements being spaced apart and arranged to be positioned at different angular phases in their respective planes of movement, and means to rotate said member and elements.

12. An apparatus for mixing the contents of a container comprising a rotary member, a plurality of container supporting elements journalled in circumferential series on said member for rotation in planes radial with respect to said member, adjacent elements being spaced apart and arranged to be positioned at different angular phases in their respective planes of movement, means to move said elements end over end in their planes during a portion of their movement with said rotary member, and means to hold said elements stationary during the remaining portion of the movement of said rotary member.

13. An apparatus for mixing the contents of a container comprising a support, a rotary table, a plurality of vertical brackets carried by said table, container supporting platforms journaled in said brackets on a horizontal axis, vertical shafts journaled in said table and operatively connected to said platforms, a fixed gear member carried by said support, a gear carried by each of said vertical shafts and meshing with said gear member, a clutch member interposed between said last-named gear and said vertical shaft and adapted to operatively connect said gear to said vertical shaft during a portion of the movement of said table; and means to operate said clutch member.

14. An apparatus for mixing the contents of a container comprising a rotary member, a container supporting element carried by said member and journaled for turning movement thereon, means to turn said supporting element during a predetermined portion of the movement of said rotary member, automatic trip means to render said last-named means ineffective, and guiding means adapted to thereafter control the position of said supporting element.

15. An apparatus for mixing the contents of a container comprising a rotary member, a container supporting element carried by said member and journaled for turning movement thereon, means to turn said supporting element during a predetermined portion of the movement of said rotary member, automatic trip means to render said last-named means ineffective, and guiding means adapted to thereafter control the position of said supporting element, said guiding means being engaged by said supporting element prior to the operation of said trip means.

16. In an apparatus of the class described, a rotary member, a container supporting element, means on said member to support said element for movement in a plane substantially radial with respect to said member, means to move said element end over end in said plane during a portion of its movement with said rotary member, means to hold said element stationary upon said rotary member during the remaining portion of the movement of the latter, and means to deliver and move the containers from said element during the last mentioned portion of the movement of said rotary member.

17. In an apparatus of the class described, a rotary member, a container supporting element journaled on said member for rotation in a plane substantially radial with respect to said member, means to move said element end over end in said plane during a portion of its movement with said rotary member, and means to hold said element stationary upon said rotary member during the remaining portion of the movement of the latter.

18. An apparatus for mixing the contents of a container comprising a rotary member, a container supporting element carried by said member and journaled for end over end turning movement thereon in a plane substantially radial with respect to said rotary member, means to turn said supporting element in said plane during a portion of the movement of the latter, said container supporting element including clamping means adapted to hold a container upon said supporting element during said portion of the movement of said rotary member, and means to render said clamping means inoperative during the remaining portion of the movement of said rotary member.

19. An apparatus for mixing the contents of a container comprising a rotary member, a container supporting element carried by said member and journaled for end over end turning movement thereon in a plane substantially radial with respect to said rotary member, means to turn said supporting element in said plane during a portion of the movement of the latter, said container supporting element including clamping means to hold a container upon said supporting element during said portion of the movement of said rotary member, means to hold said supporting element stationary upon said rotary member during the remaining portion of the movement of the latter, means to render said clamping means ineffective during the last mentioned movement, and means to deliver and remove containers from said element during the last mentioned portion of the movement of said rotary member.

20. An apparatus for mixing the contents of a container comprising a rotary member, a container supporting element, means on said member to support said element for orbital movement in a vertical plane substantially radial with respect to said rotary member, spaced means to deliver and remove containers from said element, means to move said element end over end in said vertical plane during movement between said delivery and discharge means, and means to hold said element stationary upon said rotary member during the remaining portion of the movement of the latter.

21. An apparatus for mixing the contents of a container comprising a support, a member movable on said support in a fixed path, means upon said member to support a container and journaled for repeated end over end movement in a plane transverse to the path of movement of said member, driving means on said support including a non-driving portion, and means cooperating with said driving means to drive said container support.

22. An apparatus for mixing the contents of a container comprising a support, a gear fixed to said support, a rotary member journaled upon said support, a container supporting element carried by said member and journaled for movement in a plane substantially radial with respect to said member, gear means engaging said fixed gear to rotate said element, said gear including a toothed portion arranged to rotate said gear means during its engagement therewith, and a non-toothed portion past which said gear means will move without being rotated.

23. An apparatus for mixing the contents of a container comprising a rotary member, a container supporting element, means on said member to support said element for rotary movement in a plane substantially radial with respect to said rotary member, a driving element including a non-driving portion, said rotary member being movable with respect to said driving element, and means operatively connected with said container supporting element positioned to cooperate with said driving element.

24. An apparatus for mixing the contents of a filled container including a rotatable member, means for continuously rotating said member, means on the member rotatable therewith for engaging and clamping containers positioned thereon, means for automatically operating said clamping means, as the member rotates, to grip the containers positioned thereon, and means for repeatedly moving about axes transverse to planes radial with respect to said rotatable member the clamping means and containers clamped thereby, as they rotate with the member, to tilt and upright the containers repeatedly in planes radial with respect to said member and thereby cause endwise flow of the container contents.

25. An apparatus for mixing the contents of a filled container including a rotatable member, means for continuously rotating said member, means on the member rotatable therewith for engaging and clamping the ends of upright containers positioned thereon, means for automatically operating said clamping means, as the member rotates, to grip the containers positioned thereon, and means for repeatedly moving the clamping means about an axis substantially transverse to a plane radial with respect to said member and whereby to move the containers clamped thereby in a direction substantially radial with respect to the member, as they rotate with the member, through an arc sufficient to mix the container contents.

26. An apparatus for mixing the contents of a container including a continuously rotating member, means to support a container upon said member, and means to rotate said supporting means and container end over end continuously about an axis substantially transverse to a plane radial with respect to said member for a plurality of complete rotations and through a major portion of the path of travel of the container with said rotating member, whereby to constantly agitate the container contents throughout its movement with respect to said member.

27. An apparatus for mixing the contents of a container comprising a rotary member, a container supporting element, means on said member to support said element for rotary movement on an axis substantially transverse to a plane radial with respect to said rotary member, means to move said element end over end continuously for a plurality of complete rotations thereof and through the major portion of its path of movement with said rotary member, whereby to constantly agitate the container contents throughout its movement with respect to said member and means to hold said element stationary upon said rotary member during the remainder of its travel with said member.

28. An apparatus for mixing the contents of a container comprising a rotary member, a container supporting element, means on said member to support said element for rotary movement in a plane radial with respect to said rotary member, means to move said element continuously end over end in the same direction for a plurality of complete rotations thereof and through the major portion of its path of movement with said rotary member, and means to hold said element stationary upon said rotary member during the remainder of its travel with said member.

29. An apparatus for mixing the contents of a container comprising a rotary member, a container supporting element, means on said member to support said element for rotary movement on an axis substantially transverse to a plane radial with respect to said rotary member, means to move said element end over end continuously in a plane radial with respect to said rotary member for a plurality of complete rotations thereof and during the major portion of a complete rotation of said rotary member, means to hold said element stationary upon said rotary member during the remaining portion of a complete rotation of the latter, and means to deliver and remove containers from said element during the last-mentioned portion of the movement of said rotary member.

30. An apparatus for mixing the contents of a container comprising a support, a rotary member journaled on said support, a container supporting element journaled on said member, a gear member fixed to said support, a second gear meshing with said gear member, means to operatively connect said second gear to said supporting element during a portion of the movement of said rotary member to cause said supporting element to be continuously rotated end over end for a plurality of rotations, and means to disconnect said second gear from operation of said element during another portion of the movement of said rotary member.

31. An apparatus for mixing the contents of a container comprising a rotary member, a container supporting element, means on said member to support said element for rotary movement about an axis substantially transverse to a plane radial with respect to said rotary member whereby to move a container in a plane radial with respect to said rotary member, a driving element including a non-driving portion, said rotary member being movable with respect to said driving element, said non-driving portion extending over a minor portion of the path of movement of said rotary member, and means operatively connected with said container supporting element positioned to cooperate with said driving element to repeatedly tilt and upright said container supporting element while moving over the driving portion of said driving element.

32. An apparatus for mixing the contents of a filled container comprising a rotatable member, means for continuously rotating said member, a plurality of bottle supports mounted on said member on axes substantially transverse to planes radial with respect to said rotatable member, each support having a platform for supporting a bottle, a vertically extending stem at right angles to the platform, a clamping arm at the upper end of said stem for engaging a bottle on the platform, a spring associated with said arm and urging the arm to clamping position, a cam stationarily mounted relatively to said table, means associated with said arm and engageable with the cam to move said arm to non-clamping position during a portion of the movement of said member, means for moving said supports in vertical planes about said axes to repeatedly tilt and upright the clamped containers substantially throughout the rotation of said member.

33. An apparatus as specified in claim 32, comprising means for feeding containers into and out of said supports, and means for maintaining each support in a substantially horizontal position as it passes said feeding means, whereby to receive and discharge containers in upright position.

34. An apparatus for mixing the contents of a filled container comprising a rotatable member, means for continuously rotating said member, a plurality of supports for filled containers on said members, each support having means for clamping a container, means for swinging the supports and containers clamped thereby in vertical planes radial with respect to said member as the member rotates and to repeatedly tilt and upright the containers in planes radial with respect to said member, means for maintaining the supports stationary relative to said member during a portion of the travel of the latter, and means for rendering said clamping means inoperative during said portion of travel of said member.

35. An apparatus for mixing the contents of a filled container comprising a rotatable member, means for continuously rotating said member, a plurality of supports for filled containers on said members, each support having means for clamping a container, means for swinging the supports and containers clamped thereby in vertical planes about horizontal axes substantially transverse to planes radial with respect to said rotatable member as the member rotates and to repeatedly tilt and upright the containers in planes radial with respect to said member, means for maintaining the supports stationary relative to said member during a portion of the travel of the latter, means for rendering said clamping means inoperative during said portion of travel of said member, and means for transferring containers to and from said supports during said portion of travel of said member.

36. An apparatus for mixing the contents of a filled container comprising a rotatable member, means for continuously rotating said member, a plurality of supports for filled containers on said members, each support having means for clamping a container, means for swinging the supports and containers clamped thereby in vertical planes and about horizontal axes substantially transverse to planes radial with respect to said rotatable member as the member rotates and to repeatedly tilt and upright the containers in planes radial with respect to said rotatable member, means for maintaining the supports stationary relative to said member during a portion of the travel of the latter, means for rendering said clamping means inoperative during said portion of travel of said member, and means for transferring containers to and from said supports during said portion of travel of said member, said last-mentioned means comprising an infeed wheel and an outfeed wheel disposed substantially side by side whereby the containers travel through an arc of substantially 360° on said supports.

37. An apparatus for mixing the contents of a filled container comprising a rotary member, means for rotating said member on a substantially vertical axis, a plurality of bottle supports on said member, each support having means for clamping a filled container, means for moving each support about a horizontal axis substantially transverse to a plane radial with respect to said rotary member during the rotation of said member to repeatedly tilt and upright the containers in planes radial with respect to said rotatable member, means stationarily mounted relative to said member for holding said supports stationary relative to said member and the clamping means in non-clamping position during part of the path of travel of said member, and means for automatically feeding containers to said supports and for removing containers from said support while said supports are stationary.

38. An apparatus for mixing the contents of a filled container comprising a rotary member, means for rotating said member on a substantially vertical axis, a plurality of bottle supports on said member, each support having means for clamping a filled container, means for moving each support about a horizontal axis substantially transverse to a plane radial with respect to said rotary member during part of the path of travel of said member to repeatedly tilt and upright the containers in planes radial with respect to said rotary member, means stationarily mounted relative to said member for holding said supports stationary relative to said member and the clamping means in non-clamping position during part of the path of travel of said member, and means for automatically feeding containers to said supports and for removing containers from said support while said supports are stationary, said last-mentioned means comprising a pair of dials disposed adjacent the path of travel of the supports where the clamping means is maintained inoperative.

39. An apparatus as specified in claim 37 in which the rotating member is continuously driven and the supports are maintained substantially horizontal while stationary relative to said member whereby to receive and discharge containers in upright position.

40. An apparatus as specified in claim 38 in which the rotating member is continuously driven and the supports are maintained substantially horizontal while stationary relative to said member whereby to receive and discharge containers in upright position.

ROBERT J. STEWART.